No. 736,278. PATENTED AUG. 11, 1903.
W. E. LOMBARD & E. T. LUCE.
MACHINE FOR FLESHING HIDES.
APPLICATION FILED MAR. 21, 1903.
NO MODEL. 5 SHEETS—SHEET 3.

Witnesses:
Josiah E. Reid
Nathan C. Lombard 2nd

Inventors:
Walter E. Lombard,
Edwin T. Luce,
by Walter E. Lombard Atty.

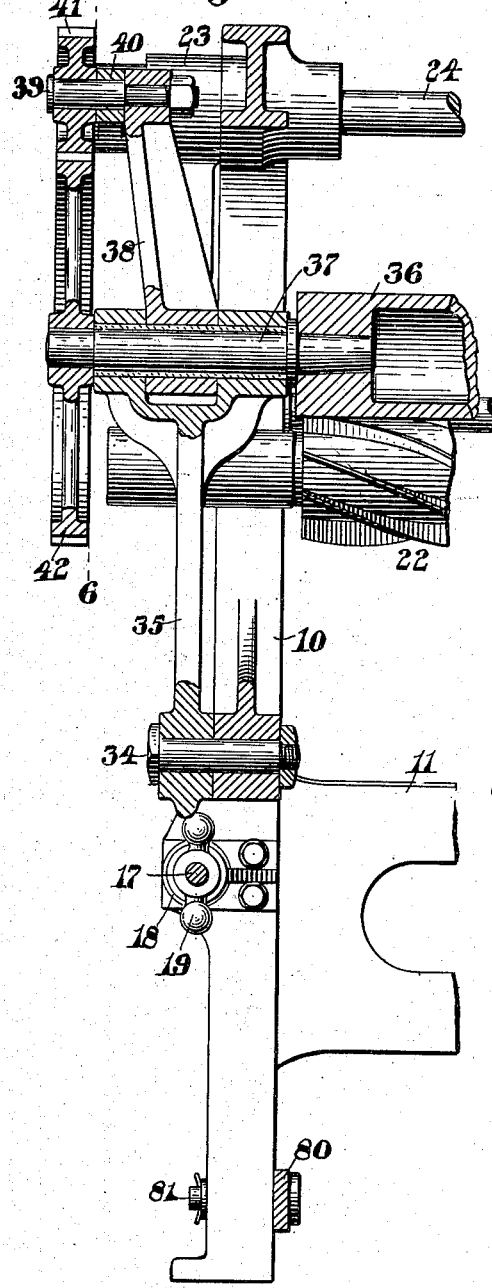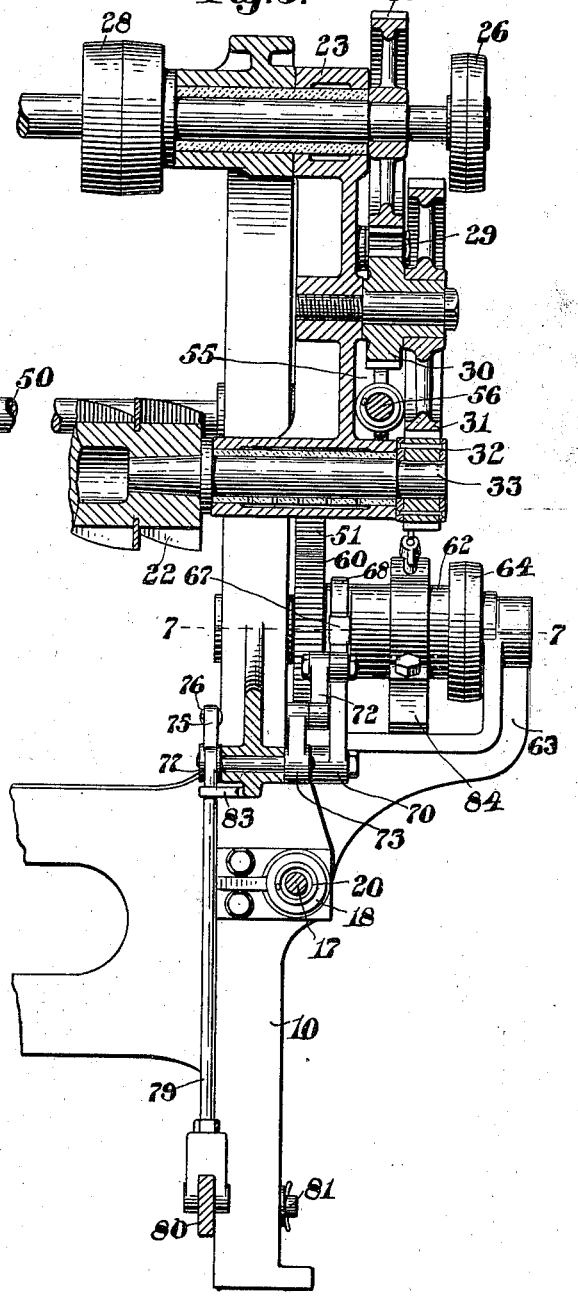

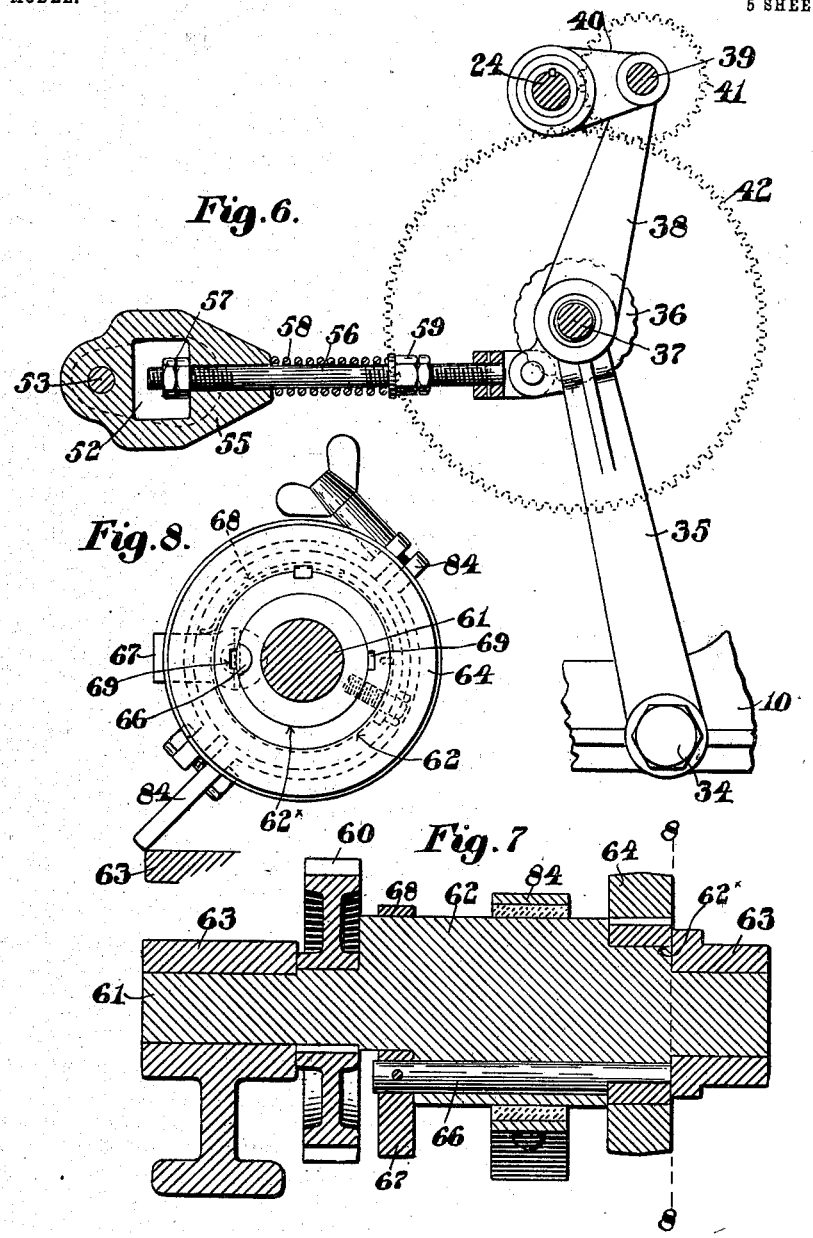

No. 736,278. Patented August 11, 1903.

UNITED STATES PATENT OFFICE.

WALTER E. LOMBARD, OF ARLINGTON, AND EDWIN T. LUCE, OF SOMERVILLE, MASSACHUSETTS, ASSIGNORS TO J. H. SEARS COMPANY, OF PORTLAND, MAINE, AND BOSTON, MASSACHUSETTS, A CORPORATION OF MAINE.

MACHINE FOR FLESHING HIDES.

SPECIFICATION forming part of Letters Patent No. 736,278, dated August 11, 1903.

Application filed March 21, 1903. Serial No. 148,827. (No model.)

*To all whom it may concern:*

Be it known that we, WALTER E. LOMBARD, a resident of Arlington, and EDWIN T. LUCE, a resident of Somerville, in the county of Middlesex and State of Massachusetts, citizens of the United States of America, have invented certain new and useful Improvements in Machines for Fleshing Hides, of which the following is a specification.

This invention relates to improvements in machines for removing superfluous flesh from hides, and has for its object the production of a machine upon which hides may be fleshed with greatly-increased efficiency and speed, while the strain upon the operator is reduced to a minimum.

It consists of certain novel features and arrangement of parts, which will be readily understood by reference to the description of the drawings and to the claims to be hereinafter given.

Figure 1:
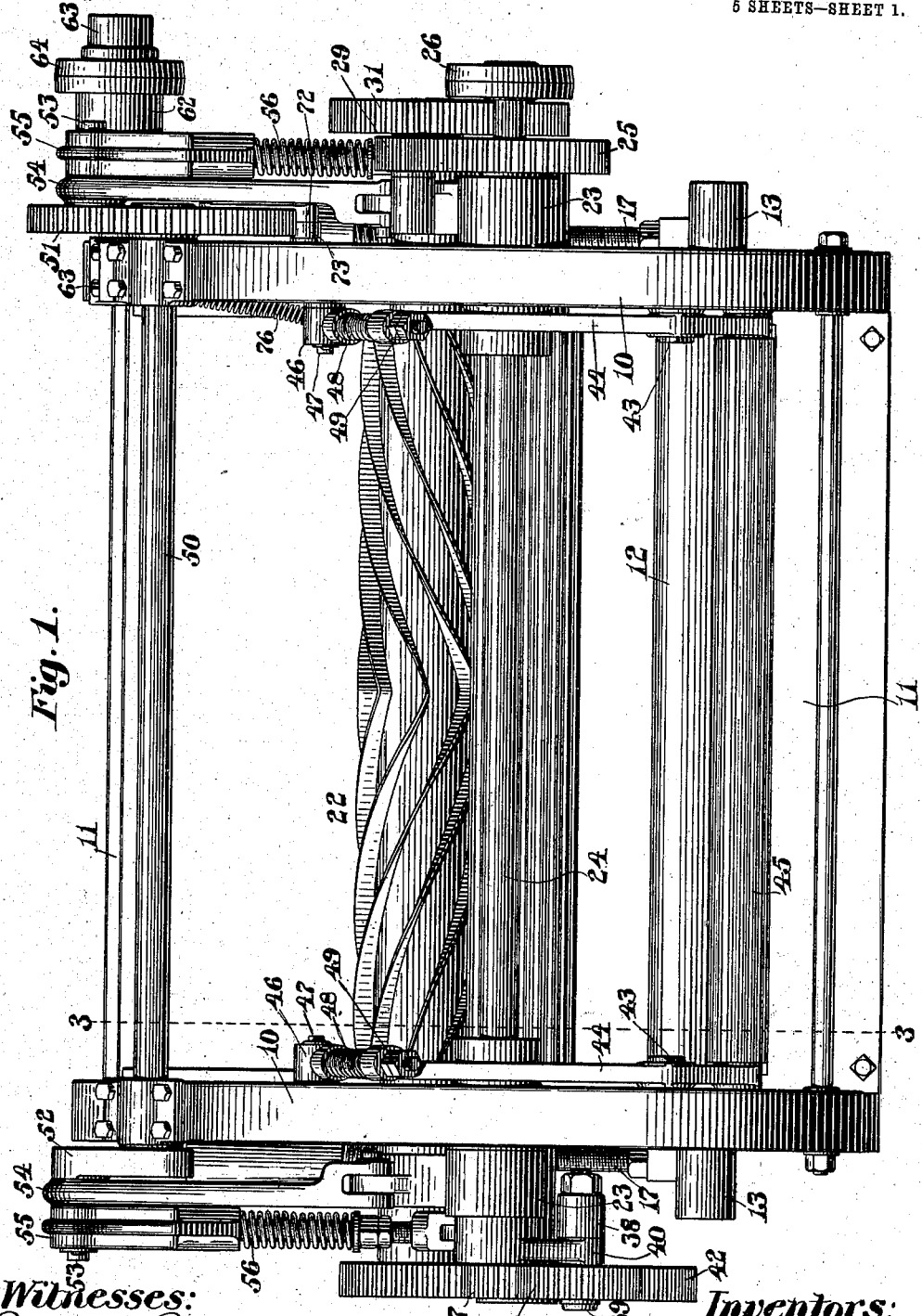
Figure 2:
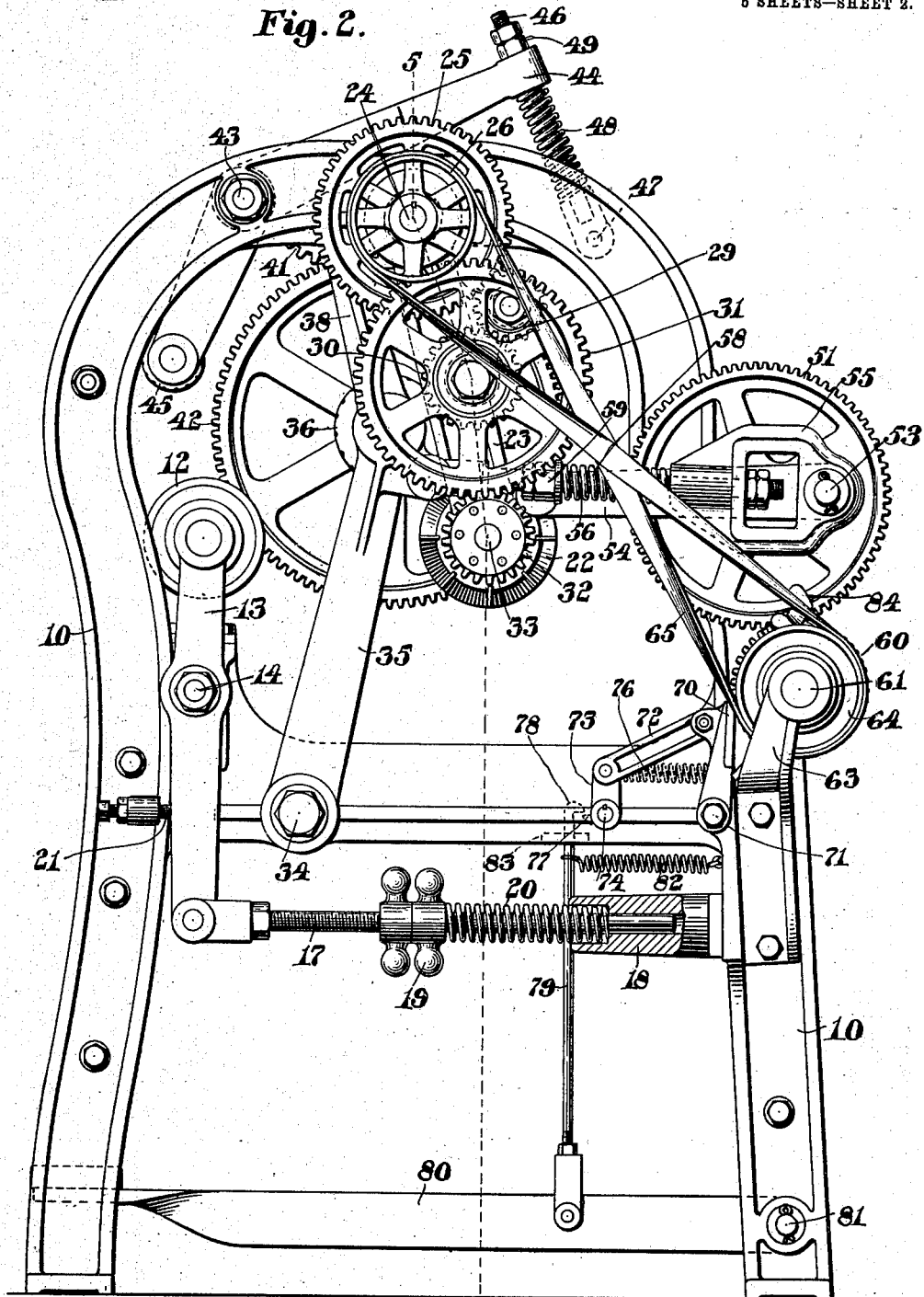
Figure 3:
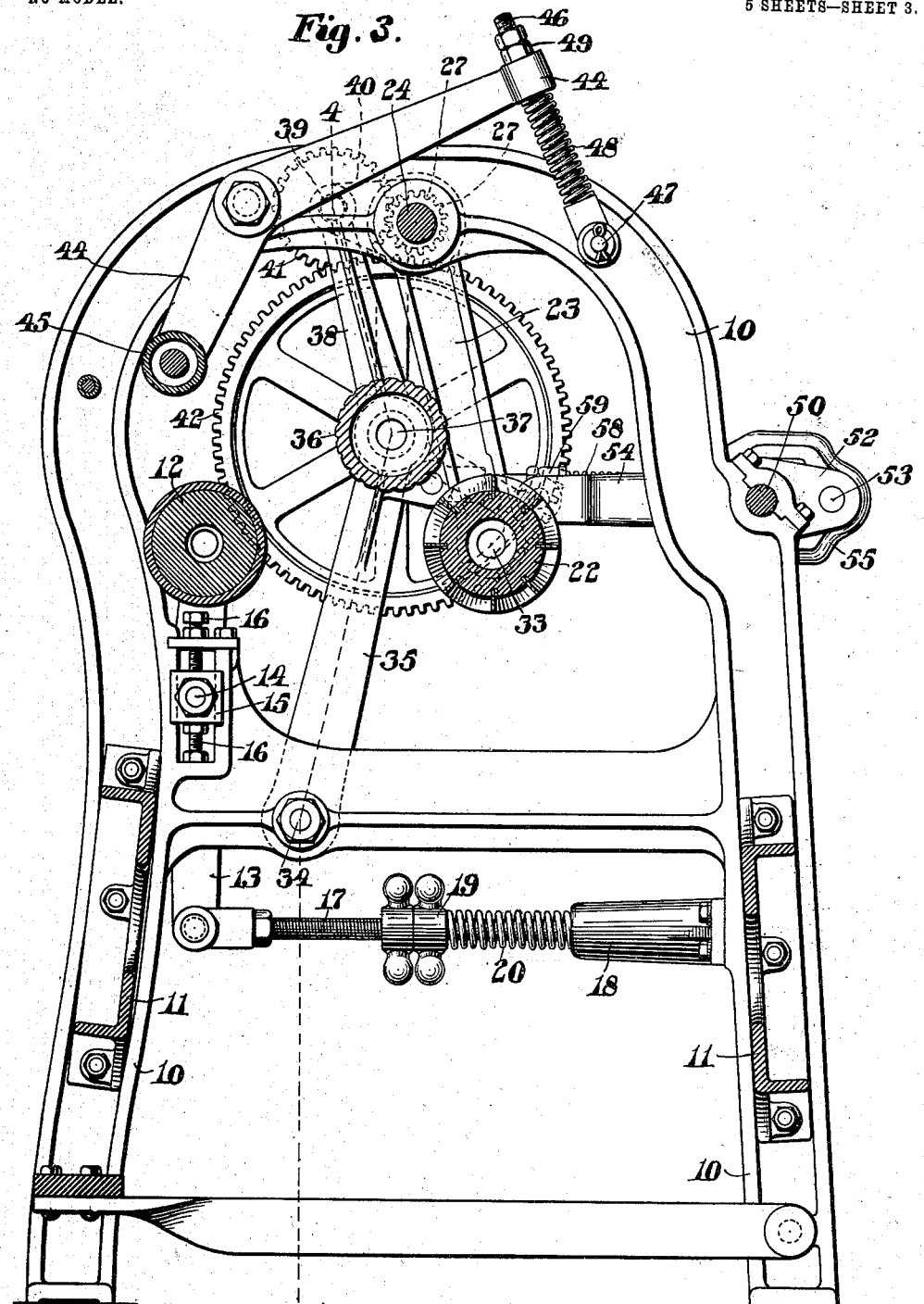

Of the drawings, Figure 1 represents a plan view of a machine embodying the features of this invention. Fig. 2 represents a right-hand end view of same. Fig. 3 represents a central vertical section, the cutting plane being on line 3 3 on Fig. 1. Fig. 4 represents a vertical section of the left frame and feed-roll-driving mechanism, the cutting plane being on line 4 4 on Fig. 3. Fig. 5 represents a vertical section of the right frame and knife-cylinder-driving mechanism, the cutting plane being on line 5 5 on Fig. 2. Fig. 6 represents a sectional elevation of the feed-roll-crank connections, the cutting plane being on line 6 6 on Fig. 4. Fig. 7 represents an enlarged sectional plan of the clutch mechanism, the cutting plane being on line 7 7 on Fig. 5; and Fig. 8 represents a sectional elevation of the same, the cutting plane being on line 8 8 on Fig. 7.

Similar characters designate like parts throughout the several figures of the drawings.

To support the working portion of the machine, a main frame is preferably provided, made up of end frames 10 10 and tie-bars 11. At the front or feed side a bed-roll 12, preferably provided with a covering of rubber or like material, is mounted in the ends of the levers 13, pivoted at 14 to boxes 15, having a vertical adjustment in the frames 10 by means of adjusting-screws 16. The lower ends of said levers 13 have pivoted thereto the threaded rods 17, having bearings at the rear of the machine in brackets 18. The rods 17 have mounted thereon adjusting-nuts 19, between which and said brackets 18 are interposed spiral springs 20, which tend to force said levers 13 against the adjustable stops 21, Fig. 2, to limit the inward movement of the bed-roll 12, but permit the same to yield outwardly when coöperating with the knife-cylinder 22, which is mounted in a pair of arms 23, pivoted to the upper end of the machine, and is preferably provided with helical cutters. The tension of the springs 20 may be regulated by adjusting the nuts 19 on the rods 17. At the pivot of said arms 23 is located a shaft 24, having secured to one end a gear 25 and a pulley 26, while on the other end is secured a pinion 27.

Intermediate of the side frames 10 a driving-pulley 28 (shown only in Fig. 5) is mounted upon said shaft 24 to drive the same. The gear 25 meshes with an intermediate gear 29, mounted on one of the arms 23, which in turn meshes with a gear 30, on a hub of which is mounted a gear 31, which meshes with a gear 32, secured to the knife-cylinder trunnion 33 for the purpose of revolving the knife-cylinder at a high rate of speed. To the frames 10 at 34 are pivoted a pair of arms 35, in the upper ends of which is mounted a feed-roll 36, preferably corrugated, on the left trunnion 37 of which is mounted a radius-arm 38, pivoted at 39 to a second radius-arm 40, the other end of which is pivoted to the driving-shaft 24.

A gear 41 is mounted on the pivot 39 of the radius-arms 38 40 and meshes with and is driven by the gear 27 on the driving-shaft 24, which motion is transmitted to a gear 42 on the shaft 37 for the purpose of revolving the feed-roll 36 and causing the hides to be fed when said roll is in position to coact with the bed-roll 12.

At 43 are pivoted levers 44, having mounted in one end thereof a supporting-roll 45. In the other end of said levers are mounted rods 46, pivoted to the frame at 47 and provided with coiled springs 48, the tension of which may be regulated by means of nuts 49 on said rods 45. This roll 45 and the bed-roll 12 serve as a substantially stationary but slightly yielding support over which the hide is thrown to receive the fleshing treatment, to be hereinafter described.

At the rear of the machine is mounted a shaft 50, having secured on one end thereof a gear 51 and on the other end a crank 52, each being provided with a crank-pin 53, which is connected by a link 54 to a knife-cylinder arm 23. A half-revolution of the crank 52 will cause the knife-cylinder to be moved toward the bed-roll 12, and the completion of the revolution of said crank 52 will cause said knife-cylinder to be moved away from said bed-roll into its non-operating position.

The crank-pins 53 are also provided with a bearing 55 for the free ends of the rods 56, pivoted to the feed-roll arms 35. The rods 56 pass freely through bearings 55 and are provided at their inner ends with nuts 57, which limit the movement of said arms 35 toward the hide-supporting rolls. The limitation of this movement may be varied by an adjustment of the nuts 57. About said rods 56 are coiled spiral springs 58 between said bearings 55 and nuts 59, adjustable on said rods 56, thereby permitting the feed-roll to yield when coacting with the hide-supporting rolls 45 and 12. The gear 51 meshes with a gear 60, mounted upon a shaft 61, having an enlarged portion 62 and mounted in bearings 63. Upon the enlarged portion 62 is mounted a pulley 64, connected by a belt 65 to the pulley 26 on the shaft 24, by which motion is transmitted to said pulley 64 to cause it to continually revolve while the machine is in use.

The enlarged portion 62 is provided with a locking-bolt 66, which projects beneath the inner periphery of said pulley 64 and is flattened at this point, so that in its normal position the flattened portion of said bolt conforms to the periphery of a hub 62* of the enlarged portion 62 and permits of a free movement of said pulley 64 about the same. One end of said bolt 66 is provided with an arm 67, which is pressed downward by a spring 68 to cause said locking-bolt 66 to turn in its bearing, so that it will engage notches 69 on the inner periphery of said pulley 64 and cause the revolution thereof to be transmitted to the shaft 61 and the gear 60, thereby transmitting motion to the gear 51 and causing a half-revolution of the cranks 51 52.

To prevent the shaft 61 from being revolved by the pulley 64 until it is desired to operate upon a hide, a stop-pawl 70 is provided, pivoted to one of the frames 10 at 71 and connected by a link 72 to a lever 73, mounted upon a short shaft 74 in one of the frames 10 and provided at its opposite end with a lever 75, connected by a spring 76 to a stationary part, and also provided with a lug 77, with which the hook 78 on the upper end of a rod 79 coacts, said rod 79 being connected to a treadle 80, pivoted at 81 to the rear of the machine. A spring 82 connects said rod 79 to a stationary part, thereby keeping it in a position to coact with the lug 77 when the treadle 80 is operated, a strap 83 limiting the movement of the upper end of said rod 79 in either direction. A brake 84, coacting with the enlarged portion 62, retards the shaft 61 as it completes a revolution.

The operation of the machine is as follows: The various parts of the mechanism being in the position shown in the drawings, a hide is taken by the operator and thrown over the upper hide-supporting roll 45, so that its center is somewhat below the bed-roll 12. The operator then places his foot upon the treadle, depressing the same, which causes the hook 78 to engage the lug 77, thereby rocking the shaft 74, and through the lever 73 and link 72 the stop-pawl 70 is removed from beneath the arm 67 on the locking-bolt 66. The spring 68 is then free to move said bolt about its axis, causing a shoulder of its flattened portion to project beyond the periphery of the reduced hub 62* and engage with a notch 69 of the pulley 64, thereby causing motion to be transmitted from the driving-shaft to the shaft 61 and the gear 60, mounted thereon. As soon as the hook 78 has acted upon the lug 77 it passes the same and permits the spring 76 to move the pawl 70 into its normal position, so that when the shaft 61 has made a complete revolution the arm 67 will come into contact with said stop-pawl 70, forcing the locking-bolt 66 out of engagement with the notches in said pulley and back into its normal position, with its flattened portion conforming to the periphery of the enlarged portion 62, thereby preventing a further revolution of said shaft 61 and gear 60 and permitting the pulley 64 to freely revolve. The gears 51 and 60 are two to one, so that a complete revolution of the gear 60 will cause a half-revolution of the gear 51, so that when the operator presses his foot upon the treadle 80 he thereby causes a half-revolution of the gear 51 and the crank 52, thereby forcing the knife-cylinder into coöperating position with the bed-roll 12 and the feed-roll 36 into a position between the hide-supporting rolls 45 and 12. When the feed-roll 36 is moved into position to coact with the hide-supporting rolls, it wraps the hide about nearly one-half the circumference of the former, thereby giving it sufficient surface of contact to feed upward the slippery material. The knife-cylinder through its gearing is being continually revolved while the feed-roll 37 is also being continually revolved, so that as soon as the cranks have moved said knife-cylinder and said feed-roll into position to operate the feed-roll immediately impinges upon the hide and causes it to be fed over the supporting-rolls, while at the same time the fleshing-cylinder immediately upon reaching its operating position commences to remove the superfluous flesh from the hide as it is fed beneath, its helical form at the same time keeping the hide smoothly stretched. When one side of the hide has been fleshed, the operator depresses the treadle 80 a second time, causing the pawl 70 to be tripped again to permit a second complete revolution of the shaft 61, thereby causing the crank 52 to make another half-revolution to move the knife-cylinder and feed-roll into their non-operating position, in which position they will be locked until the treadle 80 is again depressed, when the operation may be repeated. The hide is then reversed and is again placed upon the hide-supporting rolls, and the unfleshed portion is subjected to the action of the knife-cylinder.

By the providing of the clutch mechanism to move the knife-cylinder and feed-roll into position to act upon the hides all the strain upon the operator is removed and the power necessary to do the work of fleshing is derived from a mechanical source, which is a great improvement in the art of fleshing hides. The mounting of the hide-supporting rolls 45 and 12 in the ends of the pivoted levers controlled by springs is also an important feature of this invention, inasmuch as when the feed-roll is moved into position to coöperate with the same and they are obliged to yield in order to permit inequalities in the hides to freely pass the supporting-rolls are more sensitive to such inequalities, being on the ends of pivoted levers, than would be the case when the feed-roll would have forced them to yield by a direct thrust. It is obvious that while a crank-pin 53 is shown this pin might be enlarged to the size of an eccentric without altering the principles of this invention.

By the use of this improved machine the operator may handle the hides throughout the treatment with but slight change in position of the body.

Having thus described our invention, we claim—

1. The combination with a pair of separated supporting-rolls, of a feed-roll movable toward and from a position between said supporting-rolls, a pair of pivoted arms, and a knife-cylinder mounted in the free ends of said arms and wholly supported thereby, movable toward and from one of said supporting-rolls.

2. The combination with a pair of separated supporting-rolls, of two pairs of arms pivoted to a stationary part, a feed-roll mounted in the free ends of one pair of arms, a knife-cylinder mounted in the free ends of the other pair of arms and wholly supported thereby, means for moving said feed-roll toward and from a position between said supporting-rolls, and means for moving said knife-cylinder toward and from one of the supporting-rolls.

3. The combination with a pair of yieldable separated supporting-rolls, of a pair of arms pivoted to a stationary part, a feed-roll mounted in the free ends of said arms above said pivot and movable toward and from a position between the supporting-rolls, a second pair of pivoted arms, and a knife-cylinder mounted in the free ends of said arms below said pivot, and movable toward and from one of the supporting-rolls.

4. The combination with a pair of separated supporting-rolls, of a knife-cylinder, a pair of arms pivoted to a stationary part, a feed-roll mounted in the free ends of said arms, and yieldable means for moving said feed-roll toward and from a position between said supporting-rolls.

5. The combination with a pair of separated supporting-rolls, of a feed-roll coacting therewith, a pair of pivoted arms, a knife-cylinder mounted in the free ends of said arms, and a crank for moving the knife-cylinder toward and from one of said supporting-rolls.

6. The combination of a pair of separated supporting-rolls, two pairs of arms pivoted to a stationary part, a knife-cylinder mounted in the free ends of one pair of arms and wholly supported thereby, a feed-roll mounted in the free ends of the other pair of arms, means for moving said knife-cylinder toward and from one of said supporting-rolls, and yieldable means for moving said feed-roll toward and from a position between said supporting-rolls.

7. The combination with a bed-roll, of two pairs of arms pivoted to stationary parts, a feed-roll and a knife-cylinder each mounted in the free ends of a pair of said arms and otherwise unsupported, and means for moving said feed-roll and knife-cylinders toward and from the bed-roll and into and out of position to coact therewith.

8. The combination with a bed-roll, of a feed-roll and a knife-cylinder supported independently of each other upon oppositely-situated pairs of pivoted arms, and means for moving the feed-roll and knife-cylinder toward and from the bed-roll.

9. The combination with a bed-roll, of a feed-roll supported upon a pair of arms pivoted below said roll, a knife-cylinder supported upon a pair of arms pivoted above said cylinder, and means for oscillating said arms toward and from the bed-roll.

10. The combination with a knife-cylinder, of a pair of pivoted levers, a bed-roll mounted in one end of said levers, and means applied to the opposite ends of said levers to permit said bed-roll to yield when coöperating with said knife-cylinder.

11. The combination with a knife-cylinder, of a pair of pivoted levers, a bed-roll mounted in one end of said levers, rods pivoted to the other ends of said levers, bearings for the free ends of said rods, and springs surrounding said rods and coacting with said levers to permit said bed-roll to yield when coöperating with said knife-cylinder.

12. The combination with a knife-cylinder, of a pair of pivoted levers, a bed-roll mounted in one end of said levers, rods pivoted to the other ends of said levers, bearings for the free ends of said rods, springs surrounding said rods and coacting with said levers to permit said bed-roll to yield when coöperating with said knife-cylinder, and stops for limiting the movement of said bed-roll toward said knife-cylinder.

13. The combination with a knife-cylinder, of a pair of pivoted levers, a bed-roll mounted in one end of said levers, rods pivoted to the other end of said levers, bearings for the free ends of said rods, nuts mounted upon said rods, and springs surrounding said rods between said nuts and said bearings and coacting therewith to permit said bed-roll to yield when coöperating with the knife-cylinder.

14. The combination with a bed-roll, of a knife-cylinder, a pair of pivoted arms, a feed-roll mounted in the free ends of said arms, means for moving said feed-roll into and out of coaction with said bed-roll, a gear on said feed-roll, a driving-shaft, a gear on said driving-shaft, radius-arms between said driving-shaft and feed-roll, and a gear carried by said radius-arms transmitting motion from said driving-shaft gear to said feed-roll gear.

15. The combination with a bed-roll, of a knife-cylinder, a pair of pivoted arms, a feed-roll mounted in the free ends of said arms, a crank, and a connector between said crank and one of said feed-roll arms.

16. The combination with a bed-roll, of a feed-roll, a pair of pivoted arms, a knife-cylinder mounted in the free ends of said arms, a crank, and a connector between said crank and one of said arms.

17. The combination with a bed-roll, of a knife-cylinder, a pair of pivoted arms, a feed-roll mounted in the free ends of said arms, a crank, and a yieldable connector between said crank and one of said arms.

18. The combination with a bed-roll, of a knife-cylinder, a pair of pivoted arms, a feed-roll mounted in the free ends of said arms, a crank, a threaded rod pivoted to one of said arms, a bearing for the free end of said rod mounted on said crank, and a spring surrounding said rod and adapted to permit said feed-roll to yield.

19. The combination with a bed-roll, of a knife-cylinder, a pair of pivoted arms, a feed-roll mounted in the free ends of said arms, a crank, a threaded rod pivoted to a feed-roll arm, a bearing for the free end of said rod mounted on said crank, a spring about said rod adapted to permit said feed-roll to yield, and a device mounted upon said rod for adjusting the tension of said spring.

20. The combination with a bed-roll, of a knife-cylinder, a pair of pivoted arms, a feed-roll mounted in the free ends of said arms, a crank, a connector between said crank and said feed-roll, and means for causing said crank to make half a revolution and stop.

21. The combination with a bed-roll, of a knife-cylinder, a pair of arms pivoted to a stationary part, a feed-roll mounted in the free ends of said arms, a crank, a connector between said crank and the free ends of said feed-roll arms, a clutch, mechanism interposed between said clutch and said crank whereby a revolution of the former transmits half a revolution to the latter, and means for causing said clutch to operate.

22. The combination with a bed-roll, of a knife-cylinder, a pair of pivoted arms, a feed-roll mounted in the free ends of said arms, a crank, a connector between said crank and feed-roll, a clutch, mechanism interposed between said clutch and said crank whereby a revolution of the former transmits half a revolution to the latter, means for causing said clutch to operate, a pulley on said clutch, a second pulley on the driving-shaft, and a connector between said clutch-pulley and said driving-pulley.

23. The combination with a bed-roll, of a knife-cylinder, a pair of pivoted arms, a feed-roll mounted in the free ends of said arms, a crank, a connector between said crank and feed-roll, a clutch, mechanism interposed between said clutch and said crank whereby a revolution of the former transmits half a revolution to the latter, means for causing said clutch to operate, and a brake for retarding said clutch.

24. The combination with a bed-roll, of a pair of pivoted arms, a knife-cylinder mounted in the free ends of said arms, a crank, a connector between said crank and said knife-cylinder, and means for causing said crank to make half a revolution and stop.

25. The combination with a bed-roll, of a pair of pivoted arms, a knife-cylinder mounted in the free ends of said arms, a crank, a connector between said crank and knife-cylinder, a clutch, mechanism interposed between said clutch and said crank whereby a revolution of the former transmits half a revolution to the latter, and means for causing said clutch to operate.

26. The combination with a bed-roll, of a pair of pivoted arms, a knife-cylinder mounted in the free ends of said arms, a crank, a connector between said crank and knife-cylinder, a clutch, mechanism interposed between said clutch and said crank whereby a revolution of the former transmits half a revolution to the latter, means for causing said clutch to operate, a pulley on said clutch, a second pulley for driving the knife-cylinder, and a connector between said clutch-pulley and said driving-pulley.

27. The combination with a bed-roll, of a pair of pivoted arms, a knife-cylinder mounted in the free ends of said arms, a crank, a connector between said crank and knife-cylinder, a clutch, mechanism interposed between said clutch and said crank whereby a revolution of the former transmits half a revolution to the latter, means for causing said clutch to operate, and a brake for retarding said clutch.

28. The combination with a knife-cylinder, of vertically-adjustable blocks, a lever pivoted to each of said blocks, a bed-roll mounted in one end of said levers, and means applied to the opposite ends of said levers to permit said bed-roll to yield when coöperating with said knife-cylinder.

29. The combination with a knife-cylinder, of vertically-adjustable blocks, a lever pivoted to each of said blocks, a bed-roll mounted in one end of said levers, rods pivoted to the other ends of said levers, bearings for the free ends of said rods, and springs surrounding said rods and coacting with said levers to permit said bed-roll to yield when coöperating with said knife-cylinder.

30. The combination with a bed-roll, of a pair of pivoted arms, a knife-cylinder mounted in the free ends of said arms, a crank, a connector between said crank and one of said arms, a driving-gear at the pivot of said arms, a gear on said knife-cylinder, and gearing connecting said driving-gear and said knife-cylinder gear.

31. The combination with a bed-roll, of a pair of pivoted arms, a knife-cylinder mounted in the free ends of said arms, means for revolving said cylinder, a crank, a connector between said crank and said knife-cylinder, and means for causing said crank to make a half-revolution and stop.

32. The combination with a bed-roll, of a knife-cylinder, a crank for moving said knife-cylinder into position to coöperate with said bed-roll, a clutch for operating said crank, means for revolving said clutch, and a tripping device to permit said clutch to revolve.

33. The combination with a bed-roll, of a knife-cylinder, a crank for moving said knife-cylinder into position to coöperate with said bed-roll, a clutch for operating said crank, means for revolving said clutch, a tripping device to permit the clutch to revolve, and a treadle mechanism to operate said tripping device.

34. The combination with a bed-roll, of a knife-cylinder, a crank for moving said knife-cylinder into position to coöperate with said bed-roll, a clutch for operating said crank, means for revolving said clutch, a stop-pawl for said clutch, a spring for forcing said pawl into engagement with said clutch, a rocker-lever, a connector between the pawl and lever, a lug on said lever, a treadle, and a hook secured to said treadle and adapted in its downward movement to coact with said lug to disengage the stop-pawl and permit of a movement of said clutch.

35. The combination with a bed-roll, of a knife-cylinder, a treadle, and mechanism interposed between said treadle and said knife-cylinder whereby said knife-cylinder may be moved into its operating position and locked by a downward movement of said treadle and may be moved into its non-operating position and locked by a second downward movement of said treadle.

36. The combination with a bed-roll, of a pair of pivoted arms, a knife-cylinder mounted in the free ends of said arms, means for moving said knife-cylinder toward and from said bed-roll, a treadle, and mechanism interposed between said treadle and said knife-cylinder-moving device whereby said knife-cylinder may be moved into its operating position and locked by a downward movement of said treadle and may be moved into its non-operating position and locked by a second downward movement of said treadle.

37. The combination with a bed-roll, of a knife-cylinder, a device for moving said knife-cylinder toward and from said roll, a revoluble clutch member, another clutch member upon which said revoluble member revolves, means for connecting said clutch members to cause them to revolve together, a device for normally preventing said inner clutch member from revolving, means for operating said device to permit of a movement of said inner member, and a connector between said inner clutch member and said knife-cylinder-moving device.

38. The combination with a bed-roll, of a knife-cylinder, a device for moving said knife-cylinder toward and from said roll, a revoluble clutch member, another clutch member upon which said revoluble member revolves, a connector between the inner member and said knife-cylinder-moving device, a locking device interposed between said clutch members, a spring tending to cause said device to assume a locking position, means for preventing said locking device from moving into its locking position, and means controlled by the operator for moving said preventing means to permit the locking device to operate.

39. The combination with a bed-roll, of a knife-cylinder, a device for moving said knife-cylinder toward and from said roll, a revoluble clutch member, a clutch member upon which said revoluble member revolves, a connector between the inner member and said knife-cylinder-moving device, a depression in the inner periphery of the outer clutch member, a locking-bolt mounted in the periphery of the inner member and provided with a flattened portion which normally permits the outer clutch member to freely revolve about said inner member, an arm upon said locking-bolt, a spring coacting with said bolt tending to move it into locking position, a pawl coacting with said arm to prevent said bolt from being moved into locking position, and means for operating said pawl to permit said bolt being moved into locking position.

40. The combination with a bed-roll, of a knife-cylinder, a device for moving said knife-cylinder toward and from said roll, a revoluble clutch member, a clutch member upon which said revoluble member revolves, a connector between the inner member and said knife-cylinder-moving device, a depression in the inner periphery of the outer clutch member, a locking-bolt mounted in the periphery of the inner member and provided with a flattened portion which normally permits the outer clutch member to freely revolve about said inner member, an arm upon said locking-bolt, a spring coacting with said bolt tending to move it into locking position, a pawl coacting with said arm to prevent said bolt from being moved into locking position, a spring for moving said pawl into position to engage with said arm, a rocker-lever, a connector between said pawl and lever, a lug on said lever, a treadle, and a hook secured to said treadle and adapted in its downward movement to coact with said lug to disengage the stop-pawl and permit said inner clutch member to be revolved.

41. The combination with a bed-roll, of a knife-cylinder, mechanism connected to said knife-cylinder and adapted by one operation to move the same into operative position and lock it and move it into non-operating position and lock it by a repetition of said operation.

42. The combination with a feed-roll, two pairs of pivoted levers, hide-supporting rolls mounted in the free ends of said levers, means attached to the opposite ends of said levers to permit said supporting-rolls to yield when in contact with said feed-roll, and means for moving said feed-roll toward and from a position between said supporting-rolls.

43. The combination with a bed-roll, of a knife-cylinder, means consisting in part of a clutch for bringing said knife-cylinder and bed-roll into coöperative position, means for revolving said clutch mechanism, and a tripping device to permit said clutch to revolve.

44. The combination with a bed-roll, of a knife-cylinder, means consisting in part of a clutch for bringing said knife-cylinder and bed-roll into position to coöperate, means for revolving said clutch, a tripping device to permit said clutch to revolve, and a treadle mechanism to operate said tripping device.

45. The combination with a bed-roll, of a knife-cylinder, means consisting in part of a clutch for bringing said knife-cylinder and bed-roll into position to coöperate, means for revolving said clutch, a stop-pawl for said clutch, a spring for forcing said pawl into engagement with said clutch, a rocker-lever, a connector between said pawl and lever, a lug on said lever, a treadle, and a hook secured to said treadle and adapted in its downward movement to coact with said lug to disengage the stop-pawl and permit of a movement of said clutch.

46. The combination with a bed-roll, of a knife-cylinder, mechanism whereby at one operation said knife-cylinder and bed-roll may be brought into operating position and by a repetition of said operation may be brought into non-operating position.

47. The combination with a bed-roll, of a pair of arms, a knife-cylinder mounted in the free ends of said arms, a treadle, and mechanism whereby said knife-cylinder and bed-roll may be brought into operating position and locked by a downward movement of said treadle, and may be brought into non-operating position and locked by a second downward movement of said treadle.

Signed by us at Boston, Massachusetts, this 17th day of March, 1903.

WALTER E. LOMBABD.
EDWIN T. LUCE.

Witnesses:
NATHAN C. LOMBARD, 2d,
EDNA C. CLEVELAND.